US008849814B2

(12) United States Patent
Peters et al.

(10) Patent No.: US 8,849,814 B2
(45) Date of Patent: *Sep. 30, 2014

(54) SEARCHING, SORTING, AND DISPLAYING VIDEO CLIPS AND SOUND FILES BY RELEVANCE (71) Applicant: News Distribution Network, Inc., Atlanta, GA (US)

(72) Inventors: Gregory Alton Peters, Atlanta, GA (US); Paul Matthew Hernacki, Atlanta, GA (US)

(73) Assignee: News Distribution Network, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,913

(22) Filed: Jan. 29, 2013

(65) Prior Publication Data
US 2013/0144856 A1 Jun. 6, 2013

Related U.S. Application Data (62) Division of application No. 12/138,770, filed on Jun. 13, 2008, now Pat. No. 8,364,693.

(51) Int. Cl.
*G06F 7/00* (2006.01)
*G06F 17/30* (2006.01)

(52) U.S. Cl.
CPC ...... *G06F 17/3053* (2013.01); *G06F 17/30424* (2013.01); *G06F 17/30864* (2013.01); *G06F 17/30796* (2013.01); *G06F 17/3097* (2013.01)
USPC ............................ 707/731; 707/748; 707/765

(58) Field of Classification Search
USPC ........................... 707/765, 999.005, 731, 748
See application file for complete search history.

(56) References Cited

U.S. PATENT DOCUMENTS 6,112,201 A    8/2000   Wical
6,412,012 B1 *   6/2002   Bieganski et al. ............ 709/232
(Continued)

FOREIGN PATENT DOCUMENTS

WO      2009/152441 A1    12/2009

OTHER PUBLICATIONS

Proximity-Based Opinion Retrieval, Gerani et al; SIGIR'10, Jul. 19-23, Geneva, Switzerland, 2010 ACM 978-1-60558-896, Apr. 10, 2007.

(Continued)

*Primary Examiner* — Daniel Kuddus
(74) *Attorney, Agent, or Firm* — Jason A. Bernstein; Barnes & Thornburg LLP (57) ABSTRACT

A documents database has a plurality of documents, including but not limited to text files, video clips and sound files. Each document is associated with at least one category of a plurality of categories in a categories database, and each category has at least one keyword. A search request having at least one search term is received from a user, and a categories database is searched for categories having a keyword corresponding to the user search term to identify first level categories. The other keywords from the identified first level categories are retrieved and the documents database is searched for documents having a user search term or a retrieved keyword. The identified documents are then ranked and presented to the user. Other search expansion techniques, and display techniques, are also discussed.

2 Claims, 7 Drawing Sheets

(56) References Cited

U.S. PATENT DOCUMENTS

| | | | |
|---|---|---|---|
| 6,414,677 | B1 | 7/2002 | Robertson et al. |
| 6,674,453 | B1 | 1/2004 | Schilit et al. |
| 7,003,504 | B1 * | 2/2006 | Angus et al. ............ 1/1 |
| 7,039,860 | B1 | 5/2006 | Gautestad |
| 7,146,416 | B1 * | 12/2006 | Yoo et al. ............ 709/224 |
| 7,529,731 | B2 * | 5/2009 | Bier ............ 1/1 |
| 7,660,810 | B2 | 2/2010 | Gautestad |
| 7,685,091 | B2 | 3/2010 | Boone et al. |
| 7,917,519 | B2 * | 3/2011 | Kimbrough et al. ......... 707/749 |
| 8,364,693 | B2 | 1/2013 | Peters et al. |
| 2002/0107859 | A1 | 8/2002 | Tsuyuki |
| 2002/0152015 | A1 * | 10/2002 | Seto ............ 701/96 |
| 2002/0152051 | A1 | 10/2002 | Fukushige et al. |
| 2005/0289103 | A1 * | 12/2005 | Bier ............ 707/1 |
| 2006/0248031 | A1 * | 11/2006 | Kates et al. ............ 706/25 |
| 2006/0287993 | A1 * | 12/2006 | Yao et al. ............ 707/4 |
| 2007/0044010 | A1 | 2/2007 | Sull et al. |
| 2007/0118518 | A1 | 5/2007 | Wu et al. |
| 2007/0124235 | A1 | 5/2007 | Chakraborty et al. |
| 2008/0140643 | A1 * | 6/2008 | Ismalon ............ 707/5 |
| 2009/0313236 | A1 | 12/2009 | Hernacki et al. |

OTHER PUBLICATIONS

IEEE Xplore Digital Library, Search Result Pages; http://ieeexplore.ieee.org/search/searchresult.jsp?newsearch=true&queryText=searching+do, Aug. 9, 2012, four pages.

ACM DL Digital Library; result pages; http://dl.acm.org/results.cfm?h-1&cfid=102978289&eftoken=58309144; Aug. 9, 2012, four pages.

International Preliminary Report on Patentability for International Application No. PCT/US2009/047221, filed Jun. 12, 2009; Sep. 24, 2009.

* cited by examiner

| | CATEGORY 1 | CATEGORY 2 | CATEGORY 3 | CATEGORY 4 |
|---|---|---|---|---|
| PERSON 1 | D1<br>D2<br>D3 | D1<br>D2<br>D5 | D2<br>D4<br>D5 | D3<br>D4<br>D5 |
| PERSON 2 | D1<br>D3<br>D8 | D3<br>D6<br>D8 | D2<br>D8<br>D10 | D8<br>D6<br>D7 |
| PERSON 3 | D3<br>D5<br>D7 | D3<br>D6<br>D5 | D2<br>D8<br>D11 | D6<br>D8<br>D9 |
| PERSON 4 | D2<br>D8<br>D6 | D4<br>D8<br>D12 | D9<br>D12<br>D13 | D11<br>D12<br>D13 |

FIGURE 4

SEARCHING, SORTING, AND DISPLAYING VIDEO CLIPS AND SOUND FILES BY RELEVANCE

CROSS-REFERENCE TO RELATED APPLICATION

This application is a divisional of co-pending U.S. patent application Ser. No. 12/138,770, filed Jun. 13, 2008, the disclosure of which is incorporated herein by reference in its entirety.

BACKGROUND OF THE INVENTION

1. Field

The present invention relates to document search engines and, more particularly, to searching, ranking, and displaying documents, including but not limited to text files, video clips and sound files.

2. Description of the Related Art

Current search engines search for documents which have one or more of the search terms specified by the user initiating the search. These search engines, however, miss documents which do not contain those specific terms. Current search engines also sort or rank the identified documents by, for example, the number of times a search term is used in the documents, monetary consideration paid by a person or entity wishing for a particular document to be ranked higher, etc. This can result in a document having a higher ranking or a more prominent display position simply because someone is exploiting the system by using a search term(s) numerous times in the document, or because there is someone willing to pay to have the document ranked more highly. Current search engines also display the identified and ranked documents in a one-dimensional manner; that is, a single column which lists the highest ranked document first, the second-highest ranked document second, etc. This requires the user to review numerous documents to try to find those that are truly relevant.

SUMMARY

One method provides for searching for documents in a documents database. The documents database has a plurality of documents, each document is associated with at least one category of a plurality of categories in a categories database, and each category has at least one keyword. The documents include, but are not limited to, text files, video clips and sound files. A search request having at least one search term is received from a user, and a categories database is searched for categories having a keyword corresponding to the user search term to identify first level categories. The other keywords from the identified first level categories are retrieved and the documents database is searched for documents having a user search term or a retrieved keyword. The identified documents are then ranked and presented to the user.

Another method provides for ranking documents produced in response to a search request to a search engine. The search request has search terms. The documents are scored in accordance with a predetermined scoring process, the scores of the documents are then altered based upon at least one of: a normalized average rating for the document based upon ratings of the document by users who have accessed the document, the document type, the source of the document, the number of times the document has been accessed, the primary person featured in the document, the title of the primary person featured in the document, or the political office of the primary person featured in the document. The documents are then ranked in accordance with the results of the altered scoring. The documents include, but are not limited to, text files, video clips and sound files.

Another method provides for ranking documents produced by a search. Each search result document has an initial ranking. Event condition criteria are then applied to the documents to change the rankings to provide re-ranked search result documents. The documents include, but are not limited to, text files, video clips and sound files.

Another method provides for ranking categories. Each category has at least one keyword and a plurality of associated documents. A search engine identifies relevant categories based upon a comparison of category keywords with search terms in a search request provided to the search engine. A score is assigned to each category based upon the number of searches made regarding that category, the number of defined categories, the number of searches made for each category, the weight of the relationship between that category and all other categories, the weighted relationship between that category and another category, the weighted number of searches made against a related category, the number of documents related to that category, and the number of documents related to a category related to that category. The categories are then ranked based upon the assigned scores. The documents include, but are not limited to, text files, video clips and sound files.

Another method provides for ranking persons. Each person is associated with at least one document. A search engine identifies relevant documents based upon a search request for a person. A score is assigned to each person based upon the broadness of impact rank of the person, the number of searches made regarding that person, the number of searches made regarding each of the persons, the proximity of an election involving that person, the proximity of an election involving that person, the proximity of elections for the time before the date of the election involving that person, the proximity of elections for the time after the date of the election involving that person. The persons are then ranked based upon the assigned scores. The documents include, but are not limited to, text files, video clips and sound files.

Another method provides a display which indicates the relevance of documents to two different factors, such as categories and persons. Categories to which each document is related are identified and the persons to which each document is related are identified. The categories and the persons are ranked. An array having a plurality of cells is established, a first cell indicates documents which are related to both the highest ranked category and the highest ranked person, a second cell indicates documents which are related to both the second highest ranked category and the highest ranked person, a third cell indicates documents which are related to both the highest ranked category and the second highest ranked person, and a fourth cell indicates documents which are related to both the second highest ranked category and the second highest ranked person. Links are established from the cells to the documents, and the array is displayed. The documents include, but are not limited to, text files, video clips and sound files.

Other methods, as well as objects, features, benefits and/or advantages, will become apparent upon a review of the following description and the drawings.

DETAILED DESCRIPTION OF THE INVENTION

Turning now to the drawing and the several figures therein, the operation of various embodiments of, and various benefits of, the present invention will be discussed.

Establishing Database and Search Formalities

Figure 1A:
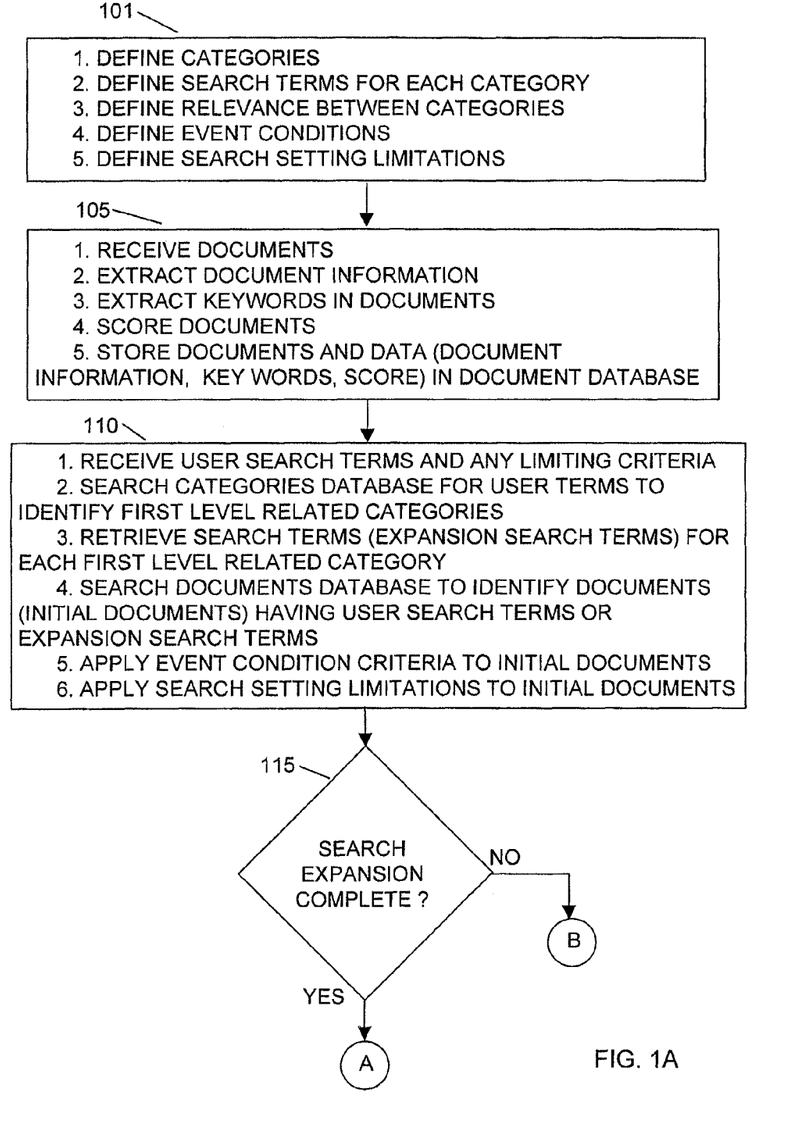
FIGS. 1A-1C illustrate an exemplary method of operation.
Figure 1B:
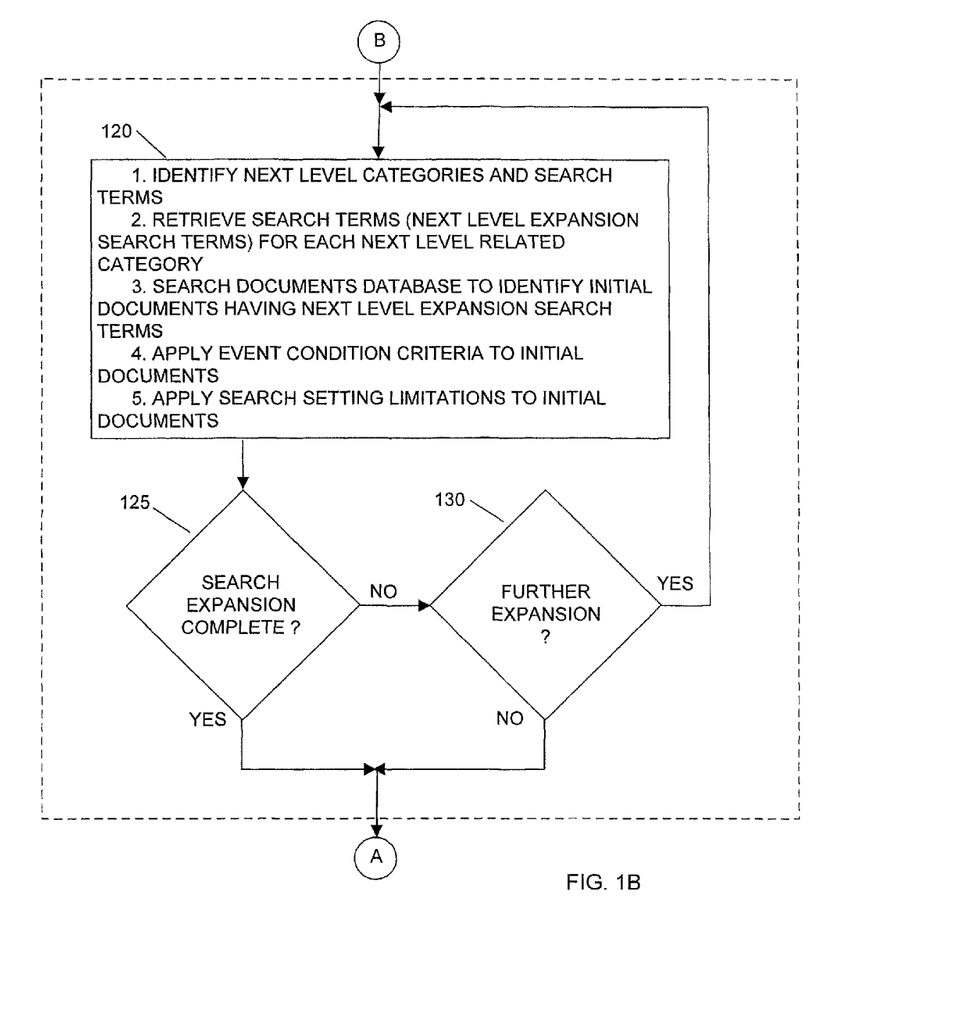
Figure 1C:
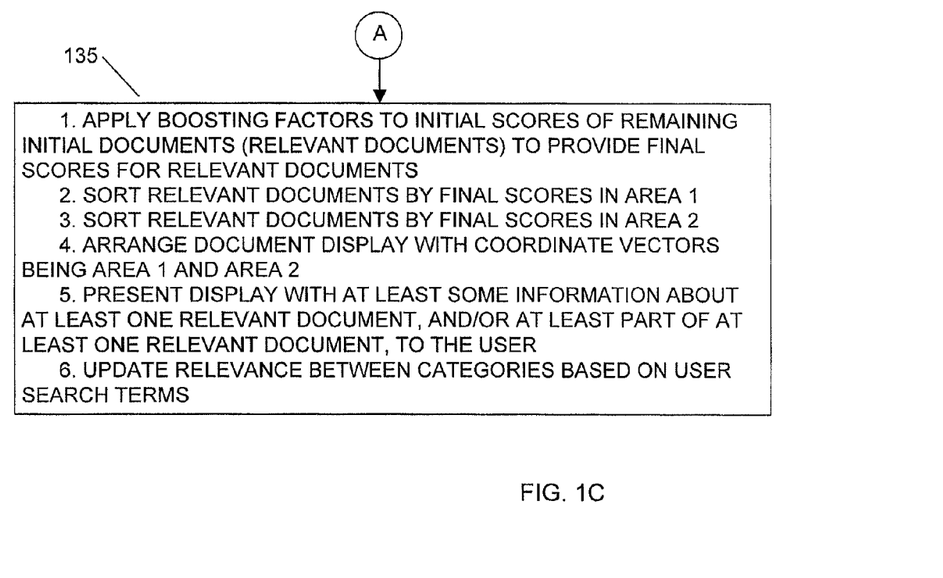

FIGS. 1A-1C illustrate an exemplary method of operation.

In section 101, the database and search formalities are defined. Categories can be added, modified, or deleted at any time. A "category" is, for example, a topic, an issue, an area of interest, etc. In one scenario, some categories might be, for example: war, energy, alternative energy, and green energy. Other categories might be, for example: business, resources, shipping, taxes, regulations, labor, environment, spills, and carbon footprint. Still other categories might be, for example: unemployment, foreclosures, homeless persons, shelter, food, and welfare.

Categories are defined by keywords, and a keyword may be associated with more than one category. For example, the category "oil" might have keywords such as oil, crude, well, tanker, and pipeline; the category "Iraq" might have keywords such as oil, progress, etc.

Also, the initial relevance (weight, or strength of association) between categories is defined. Categories may be related by any one or more of several factors, discussed below. For convenience, the relationship between two categories is expressed as a number between zero (no relationship) and one (extremely closely related), although the relationship could also be expressed as a number between zero and one hundred, or between any two numbers which adequately define and encompass the desired relationship range. These categories, their respective keywords, their relationships, and the strength of their relationships are stored, such as in a categories database, table, or index. Alternatively, such information could be stored in a documents database, table, or index.

Possible event conditions are also defined. An event condition is a statement of an event, the occurrence of which will change the relevance of a document. For example, in a political context, event conditions may include a date certain, a date defined by an election, a date defined by a qualifying deadline, etc. Documents relating to candidates before an event condition occurs may be considered to be relevant, whereas documents relating to candidates after that event condition occurs may not be considered to be relevant except for, perhaps, documents related to the winner. Thus, for example, if there are three candidates for a position, then statements by and articles about all of them may be relevant up to the primary election, at which point at least one of the candidates will most likely be removed. Therefore, from that point, statements by and articles about that candidate may be deemed as non-relevant to the search request. Similarly, after the run-off election, there will presumably be one winner, so statements by and articles about the two losing candidate may be deemed as non-relevant. The result is that statements by and articles about the winning candidate will possibly be relevant for future searches but statements by and articles about the losing candidates will no longer be considered to be relevant. Preferably, event conditions relating to a document are defined by an administrator and may be, if desired or necessary, updated from time to time. For example, if the primary election is the event condition and the person does not advance, statements by and articles about that candidate may be removed according to the event criteria but, if the election results are then overturned and the candidate advances to the next election, or the candidate is then nominated for a related office or position, then the administrator can remove or modify the event condition so that those documents may still be relevant until, if appropriate, after the next election. Conversely, an event condition may define the point at which a document does become relevant. For example, documents regarding election run-off procedures may be deemed as non-relevant to a search until the primary election is over.

In one embodiment, an event criteria applies to a document across all the categories with which that document is associated. In another embodiment, an event criteria applies to the document only for a specified category. Thus, if a document is related to one category the event criteria may specify that it be removed as a relevant document for that category; but if the document is also related to another category, which does not have event criteria, then the document is retained as a relevant document for that category.

It will be understood that "removed", "retained", "discarded", and similar words refer to whether a document is to be further considered in the search results; they are preferably not removed from the document database.

Possible search setting limitations are also defined. These allow a user to restrict the search to, for example, in a political context, an occurrence start date, an occurrence end date, a posted start date, a posted end date, a speech, a town-hall meeting, a debate, an advertisement, an interview, a candidate for a political office, a holder of a political office, a media document, a special interest group document, a political party document, a user-generated document, a type of political race, a year of a political race, a country, a state, a county, a city, a municipality, a regional governmental body, etc. For example, if a search setting limitation is a town-hall meeting, then documents which do not involve a town hall meeting will be removed from the list of initial documents, even if the documents have one or more of the search terms or keywords.

The Document Database

In step 105, the documents are migrated into the database. Documents can be placed into the database at any time, such as when a new document becomes available or is uploaded. Although references herein are to placing in, or migrating a document into, the database, such references also encompass placing a link in the database to the document. The documents include, but are not limited to, text files, video clips and sound files.

Whenever a new document is received and is to be entered into the documents database, it is assigned or linked to one or more categories. Thus, each category is associated with, or linked to, or references, one or more documents. Once a document is received, the information therein is extracted. For text files, this is a straightforward operation. For non-text files, such as video clips or sound files (also called sound bites), the information may be recovered by commercially available software which converts the audio into a text file. For non-text files, such as scanned or image files, the information may recovered by commercially available software which performs optical character recognition on the file. In one embodiment, the documents include text files, video clips, sound bites, scanned files, and image files. In another embodiment, the documents are primarily video clips. Also, data may be added to files, especially for, but not limited to, non-text files, which indicates, for example, the date of the document, the primary speaker, the primary author, the source of the document, other speakers or authors, the location where a speech, presentation, demonstration, event or political gathering occurred, etc. All of this information constitutes document data. The documents and document data are stored, such as in the documents database. Preferably, common words such as "a", "an", "the", "or", "by", etc. are not included in the document data. Also, preferably but not necessarily, when a search request is received, the document data is searched, rather than the actual document. Of course, the actual document could be searched if in a searchable form. Unless the context requires otherwise, phrases such as searching the document data, searching the document, and searching the document database are generally used interchangeably herein.

The document data is examined for the previously-defined keywords. The presence of each keyword in the document data and, possibly but not necessarily, also the number of times each keyword is used, are stored as part of the document data. The examination of the document data for the previously-defined keywords also preferably includes examining the document data for roots and variations thereof, for example, "buy" encompasses "buys", "buying", "bought", etc. The areas of a document that are preferably examined to obtain the document data are the title, abstract, summary, syllabus, and body. Some information may also be present in metadata but, as metadata has been the subject of great commercial exploitation, especially with respect to web pages, metadata which is part of the original document may be ignored, or may be regarded as suspect until verified. Of course, the metadata could also be considered without restriction.

In one embodiment, the entity submitting the document for entry into the database may also submit an initial designation as to the categories to which a document is related. An administrator can change these designations at any time. Further, other category designations may be added based upon other factors as discussed herein.

In one embodiment, as part of the document data, the categories to which the document applies are also stored. In another embodiment, each category also has an index which indicates the documents which are relevant to (contain one or more keywords of) that category. Event conditions may also be stored as part of the document data.

The document is preferably also given a score for each category, the score being dependent upon the number of keywords of a category that are also in a document; the more keywords for a category that are present, rather than just the number of times that a keyword is present, the higher the score of the document for that category will be. The score may also depend, although preferably to a much lesser degree, or not at all, upon the number of times that a keyword is present in the document.

A typical user is not usually really looking for words but is looking for documents which address a specific item of interest. The only method provided by the prior art for finding those documents is, however, for the user to enter specific search words which the user hopes will appear in those documents. Unfortunately, there are often two or more words or phrases which can be used to express the same idea. If the user chooses the wrong words for the search, that is, words which the author of the document did not choose to use, then that document will not be found, however relevant it may be.

For example, if the user is looking for documents which discuss the relationship between a barrel of oil and a gallon of gasoline, the user may enter the search terms "oil" and "gasoline". If the most relevant document on this subject uses, instead, "sweet crude", and "refined petrochemical products", then that document will not be found due to the different choice of words used by the author of the document with respect to the choice of search terms from the searcher.

The search expansion process described herein provides for searching beyond merely the user's search terms. Rather, keywords of categories which have a relationship to the user's search terms also become search terms. This increases the likelihood that documents will be identified which are relevant to the user's specific item of interest, rather than limited to documents identified only by the user's choice of words to express the item of interest.

Search Expansion

In step 110 a search request is received from a user, the search request including the user search terms and any limiting criteria. The first step is to expand the search query beyond the user search terms. The categories database is examined to identify categories which have one or more of the user search terms. These are referred to as "first level related categories". These categories are related to the user's search because they have, as keywords, one or more of the user search terms. The keywords of these first level related categories are then retrieved preferably, but not necessarily, excluding keywords which are the same as the user search terms as those keywords would be duplicative. These retrieved keywords, which are now expansion search terms, along with the user search terms, then constitute the search terms for an expanded search query. Now, instead of merely searching using the user's search terms, the expanded search query is conducted using those user search terms as well as the retrieved keywords for categories which are related to the user's search terms. Thus, the search identifies documents containing the user search terms as well as documents which contain keywords from the related categories.

The document data in the documents database is searched using the expanded query to identify documents (the initial documents) which have any user search term or any expansion search term. If an initial document has event condition criteria associated with it then the event condition criteria is applied. Also, any search setting limitations specified by the user are applied to the initial documents. The remaining initial documents are then considered to be relevant documents.

Decision 115 then tests whether the search expansion is complete. In one embodiment, the search expansion is complete if there are at least a predetermined number of documents remaining (the relevant documents) after application of any event condition criteria and any search setting limitations. This predetermined number may be any desired number but if the predetermined number is set too low then the searcher may not be able to see enough documents to satisfy his/her interest and, conversely, if the predetermined number is set too high then the searcher may be presented with too many documents, which may prompt the searcher to needlessly, and possibly counterproductively, narrow the search. If the search expansion is complete then step 135 is executed. If the search expansion is not complete then step 120 is executed.

Other criteria may also be used to determine whether the search expansion is complete. This is discussed below with respect to decisions 125 and 130.

In step 120 the next level related categories and search terms are identified. The categories database is then examined to identify categories which have one or more of the keywords from the first level categories. The keywords corresponding to the user's search terms are preferably not used because, if any of those keywords were present in a category, that category would already have been identified as a first level category.

The categories identified by searching for these first level category keywords are referred to as "second level related categories". They are related to the user's search because they have, as keywords, one or more of the keywords used by a category which was more directly related to the user's search. The remaining keywords of these second level related categories are then retrieved. These retrieved keywords, which become the second level expansion keywords, then constitute the search terms for a further (second level) expanded search query.

The document data in the documents database is then searched using these second level expansion keywords to identify the initial documents which have any of those second level expansion search terms. If an initial document has event condition criteria associated with it then the event condition criteria is applied. Also, any search setting limitations specified by the user are applied to the initial documents. The remaining initial documents from this second level expanded search query are also considered to be relevant documents.

Decision 125 tests whether the search expansion is complete. If the search expansion is complete then step 135 is executed. If the search expansion is not complete then decision 130 is executed.

Decision 130 tests whether further expansion is appropriate, that is, whether further expansion is likely to lead to additional relevant documents. Decisions 115, 125 and 130 serve to expand the search, and to limit or terminate the search when a desired result has been achieved or when further expansion would be of little benefit, i.e., the search is complete. For example, if no new keywords were identified in last pass through step 120, then further expansion is probably not worthwhile. Also, if no new documents were identified in the last pass through step 120, then further expansion is probably not worthwhile. Also, if at least some predetermined number of related categories has been identified then further expansion is not desired. Also, if the remaining categories are too distantly related to the first level category then further expansion is probably not worthwhile. For example, if the highest weighed relationship a second level category has to any first level category is 0.7, and if there are two third level categories related to that second level category, and if one third level category has a weighted relationship of 0.8 to that second level category and the other third level category has a weighted relationship of 0.4 to that second level category, then that one third level category will have a weighted relationship of 0.56 (0.7×0.8) to that first level category and that other third level category will have a weighted relationship of 0.28 (0.7×0.4) to that first level category. If, for example, the minimum acceptable weighted relationship with respect to the first category is 0.5, then the one third level category will be deemed to be sufficiently related (0.56) to permit further search expansion by the keywords in that third level category, but the other third level category will be deemed to be too distantly related (0.28) to warrant further search expansion by the keywords in that third level category.

Other minimum acceptable weighted relationship values can be used but too high a value may terminate the search expansion too quickly and miss relevant documents, whereas too low a value may result in too many documents being produced.

If further expansion is appropriate then a return is made to step 120 to identify next (third, fourth, etc.) level categories, retrieve their third, fourth, etc. level keywords, search the documents database, and apply event condition criteria and search setting limitations to these third, fourth, etc., level documents. If further expansion is not appropriate then step 135 is executed.

In addition to the above, the search may also be expanded based upon synonyms. As mentioned herein, there are often two or more words or phrases which can be used to express the same idea. Therefore, in one embodiment, there is also a synonyms table. When a search request is received, the synonyms table is examined for words and/or phrases corresponding to the search terms. These synonyms are then used in the expanded search. For example, synonyms for "war" might be "battle", "conflict", "fight", or "engagement"; and synonyms for "gas" might be "fuel" and "petrol". Use of synonyms increases the likelihood that relevant documents will be found.

In a variation of this embodiment, the table also indicates a weight value for each synonym which indicates the degree of relationship between the word and its synonym(s). In the preferred embodiment, this weight value has a range of 0 to 1. Other ranges can be used, if desired. A value of 1 indicates that the words are full synonyms, whereas a value of 0 indicates that the words have little or no relationship as synonyms. This weight may be used to determine the relevance of the document to the original search, such as in conjunction with, for example, the document scoring technique described elsewhere herein.

In step 135 the relevant documents from all of the searches are ranked and displayed. It will be recalled that event condition criteria and search setting limitations were applied to the initial documents and thus removed certain initial documents, the remaining documents being the relevant documents. These relevant documents have initial scores based upon the number of user search terms that appear in the document, the number of keywords that appear in the document, and the relevance of the category in which the keywords appear in the document. Boosting, or enhancement, factors are then preferably applied to the relevant documents to provide final scores for the documents. Categories may also become related categories based on user searches, so step 135 also preferably updates the relevance between categories based upon the current user search terms.

At this point it is possible to simply rank the documents by their final scores and to present the documents as a single column or table of documents to the user.

In another embodiment, however, further processing is performed and the documents are presented in an array display which has at least two areas of correlation. In an array presentation the relevant documents are ranked according to their scores in a first area and in a second area. These ranked documents are then displayed in a two-dimensional form, with one coordinate vector being the first area and the second coordinate vector being the second area. A preferred form of display of an array is an X-Y matrix; another form of display of an array is a circular display, with the radius being the first area and the angle being the second area. Other forms of display are possible and contemplated, and three-dimensional (for example, X, Y, Z coordinates), and higher displays are also possible and contemplated. Other forms of display, and three-dimensional and higher displays, however, are harder to present, may be less meaningful or useful to the searcher, and/or may require additional or excessive processing time.

In one embodiment, such as politics, one area or coordinate may be persons of interest in the political scene, and the other area may be topics of current public interest in the political scene. In another embodiment, such as in sports, one area or coordinate may be batting statistics for major players, and another area or coordinate may be pitching statistics for prominent pitchers. In another embodiment, such as in finance, one area may be the price of a particular resource, such as oil, rice, corn syrup, etc., and the other area may be prices of various consumer goods, such as gas, clothes, appliances, etc.

In the above, decision 115 tested whether the expansion was complete and, if not, expansion was performed and decision 125 then tested whether the expansion was then complete. In another embodiment some, or all, of the related categories are identified before searching the documents database. For example, after retrieving the first level search terms in substep 3 of step 110, it is possible to go directly to step 120, identify and retrieve keywords for the next level in substeps 1 and 2 of step 120, perform decision 130, and repeat the process until decision 130 indicates no further expansion. In this manner, all of the keywords for all of the related categories would have been identified before searching the documents database. At that point the documents database would then be searched using the user's search terms and all of the identified keywords (as in step 110, substep 4, and step 120, substep 3) to identify the initial documents. The event condition criteria and search settings limitations would then be applied to these initial documents (as in step 110, substeps 5 and 6, and step 120, substeps 4 and 5) to yield the relevant documents. Step 135 would then be performed on those relevant documents.

In another embodiment, each category also has an associated index which indicates the documents related to that category, as mentioned above. Therefore, when a search request is received, the document data is only searched for search terms which are not keywords. These documents, and the documents listed in the associated index for the identified first level categories, become the initial documents. This procedure may save time and processing power as compared to searching for each search term and each keyword in each document in the database. For example, by preprocessing the documents in this manner, if a search request arrives and all of the search terms are keywords, then there is no need to search the documents for the search terms.

In another embodiment, rather than testing whether expansion is complete after each expansion effort, expansion is conducted until the relevance of a category to any first level category is below the minimum value, as discussed above. Once the appropriate level of search expansion has been determined, the documents listed in the indices for the identified categories also become initial documents.

In one embodiment, when documents are presented, the search terms and keywords in that document are highlighted, or underlined. It will be recalled, however, that documents may be submitted by entities along with an initial designation of categories. If this is permitted then, until it has been verified that the document has at least one keyword for each designated category, it is preferable to search the initial documents for the presence of at least one search term or keyword from the first level related category and any other level related categories. If the document does not contain a search term or a keyword then that document is deemed to be non-relevant to the search.

In another embodiment, boosting (substep 1 of step 135) is performed before applying the event condition criteria and search settings limitations to these initial documents (as in step 110, substeps 5 and 6, and step 120, substeps 4 and 5). This is not preferred, however, because it uses processing time to process a document which may later be removed.

In another embodiment, substep 6 of step 135 (updating relevance) may be performed at any point, such as immediately after the first level related categories are identified.

Although the preferred embodiment uses all of the techniques described above, the various described features can be used independently and individually, as desired. For example, the search expansion technique could be used to identify relevant documents, which are then simply sorted in a conventional manner and presented to the user in a conventional manner, and without applying event condition criteria or search setting limitations, or boosting, or ranking by areas, or using two-dimensional displays. As another example, the event condition criteria could be applied to documents identified by a conventional search engine to influence the rank or relevance of the documents. As another example, the search settings limitations could be applied to documents identified by a conventional search engine to influence the rank or relevance of the documents. As still another example, the boosting factors could be applied to documents identified by a conventional search engine to influence the rank or relevance of the documents. As still another example, ranking by areas, and/or using two-dimensional displays could be applied to documents identified by a conventional search engine to display the documents in a more meaningful manner.

Categories

Figure 2A:
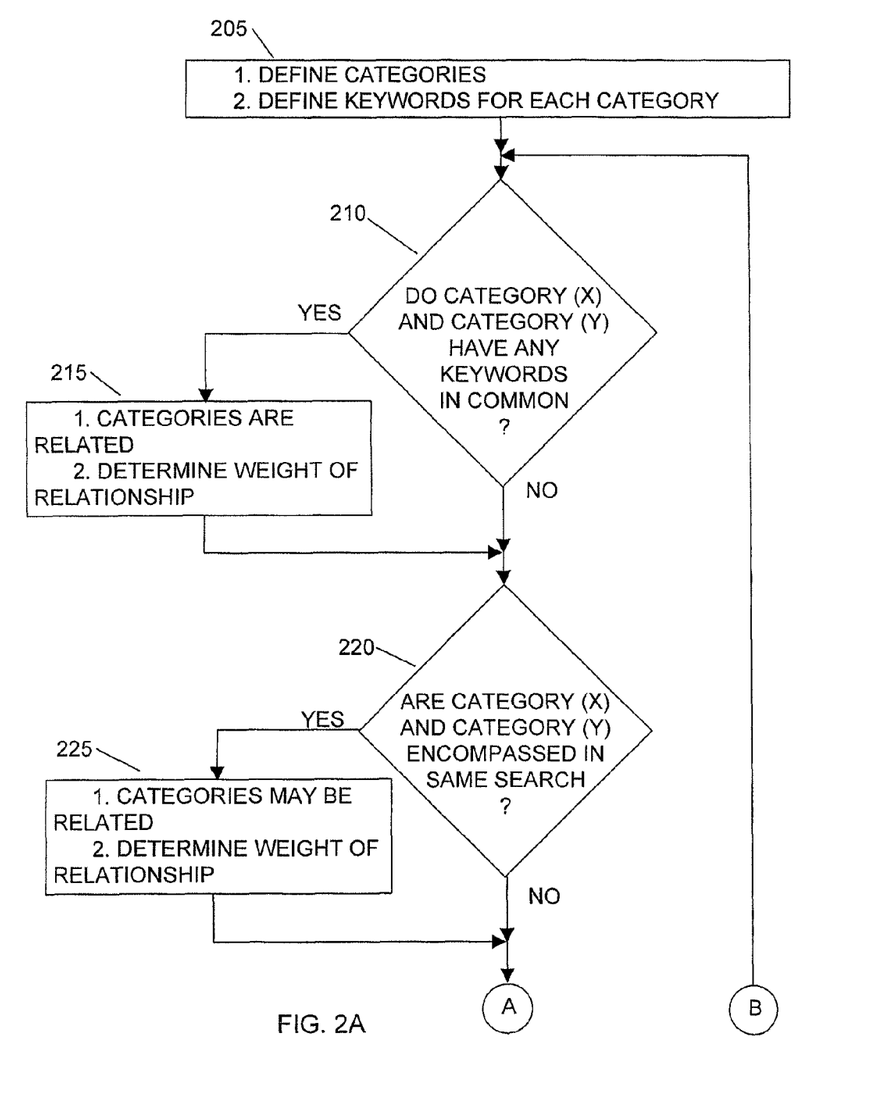
FIGS. 2A and 2B illustrate the process of establishing a relationship between categories and a weight for that relationship.
Figure 2B:
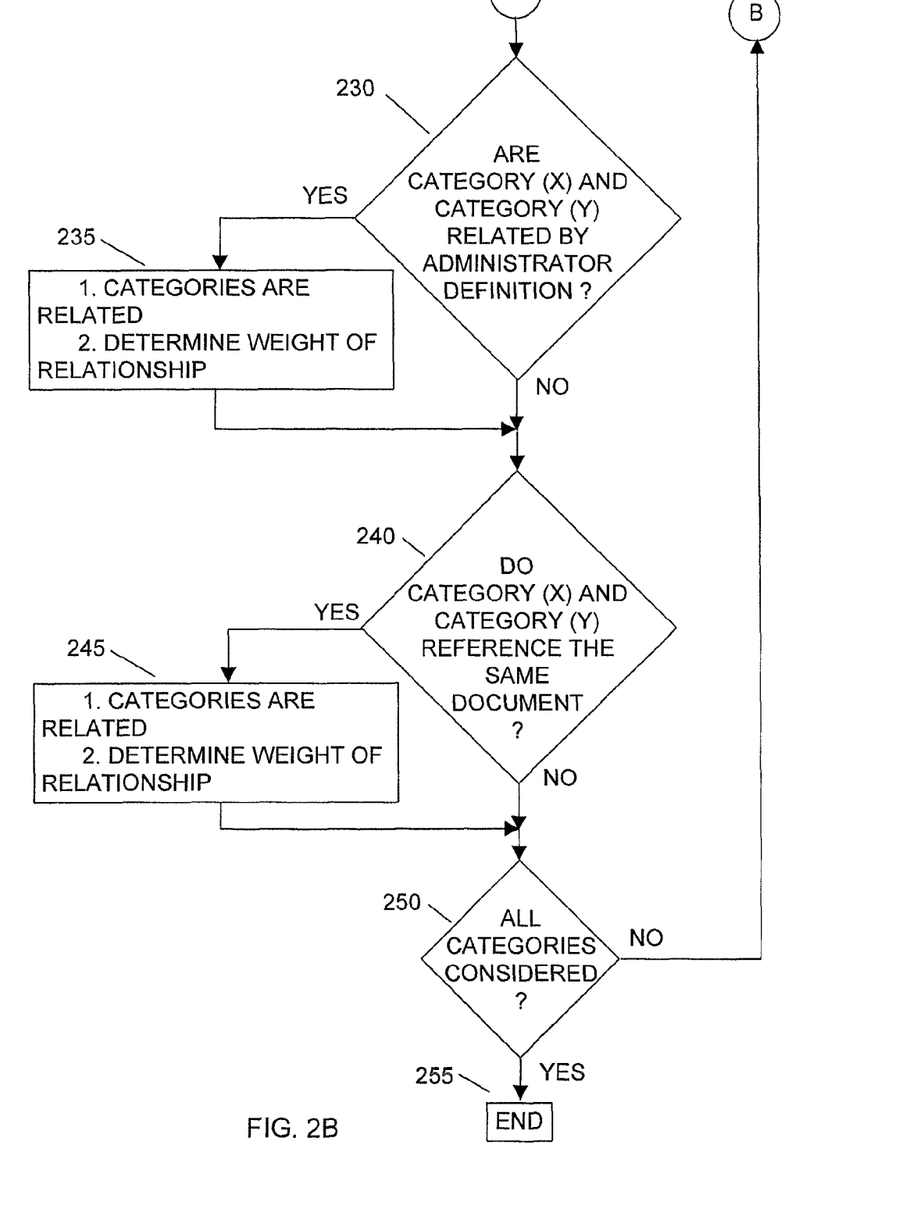

FIGS. 2A and 2B illustrate the process of establishing a relationship between categories and a weight for that relationship. Categories may be related as a result of any one or more of several factors. For example, if two categories have at least one keyword in common then they are related. Also, the more keywords that the categories have in common then the more strongly related they are. For convenience, the relationship between two categories is expressed as a number between zero (no relationship) and one (extremely closely related), although the relationship could be expressed as a number between zero and one hundred, or between any two numbers which adequately define and encompass the desired relationship range. These categories, their respective keywords, their relationships, and the strength of their relationships are stored, such as in the categories database.

In step 205 the categories and their respective keywords are defined, as previously mentioned. Decision 210 tests whether two categories (Category (X) And Category (Y)) have any common keywords. If not, decision 220 is executed. If so, then in step 215 the categories are deemed to be related, and the weight of the relationship between these two categories is determined. The weight of the relationship is based upon the number of common keywords and the total number of keywords. For example, if two categories share one or more common keywords, and have only a few differing keywords, then they are strongly related. If, however, two categories share only one common keyword, and have many differing keywords, then they are weakly related. Decision 220 is then executed.

If a search request has, for example, two search terms, and one search term is a keyword in a first category but not in a second category, and the other search term is a keyword in the second category but not in the first category, and if numerous searchers submit similar search requests, so that these two seemingly unrelated categories are repeatedly both invoked by searches, then there is the presumption that the searchers have identified a previously unrecognized relationship, or a new relationship, between the two categories. For example, at one point in the past, "Freon" and "ozone layer" might have been unrelated categories. Decision 220 therefore tests whether two categories are repeatedly both encompassed in search requests. If not, decision 230 is executed. If so, then in step 225 the categories are deemed to be related, and the weight of the relationship between these two categories is determined. The weight of the relationship is based upon the number of number of searches that invoke two or more categories which do not have a common keyword and the total number of searches for those categories. The more searches there are which invoke both of these categories then the stronger the relationship is between them.

Categories may also be deemed to be related by action of an administrator. So, even if two categories do not have any common keywords, an administrator may decide, and therefore define, that two categories are related. For example, an administrator may define the category "oil" and the category "alternative energy" to be related, even if they do not have any common keywords. If a relationship is defined by an administrator, then the strength of the relationship is preferably based on a vote of the administrators. In the preferred environment, there are a plurality of administrators, and any administrator can define two categories as being related. Preferably, however, a lone administrator cannot define the weight between the two categories. Rather, each administrator votes on the weight and the votes determine the weight assigned. In one embodiment, the weight assigned is the average value of all of the votes cast. In another embodiment, the weight assigned is the median value of all of the votes cast.

Decision 230 therefore tests whether an administrator has defined two categories as being related. If not, decision 240 is executed. If so, then in step 235 the categories are deemed to be related, and the weight of the relationship between these two categories is determined. Then decision 240 is executed.

Two categories may also be related if they reference the same document or documents. The more documents they have in common, the stronger the relationship between the categories, even if they do not have any keywords in common. Decision 240 therefore tests whether the two categories reference the same document. If not, then decision 250 is executed. If so, then in step 245 the categories are deemed to be related, and the weight of the relationship between these two categories is determined. The weight is dependent upon the number of common documents and the total number of documents that each category references.

Decision 250 tests whether the relationships between all categories have been considered or updated. If not, a return to step 210 is made and the relationship between two more categories are considered. If so, then in step 255 the process is ended.

The decisions and processes above are preferably performed repeatedly, such as on a predetermined schedule, and/or whenever a qualifying search occurs, and/or when an administrator inputs a suggestion that two categories are related, and/or when a new category is defined, and/or when the keywords for a category is updated, and/or after a predetermined number of new documents have been entered. Also, the particular order of the decisions and steps is not critical so, for example, the administrator decision process could be performed before the qualifying search process. In one embodiment, once the possible weights have been determined, the highest weight is deemed to be the appropriate weight. In another embodiment, the average weight, or the median weight, is deemed to be the appropriate weight.

Figure 3:
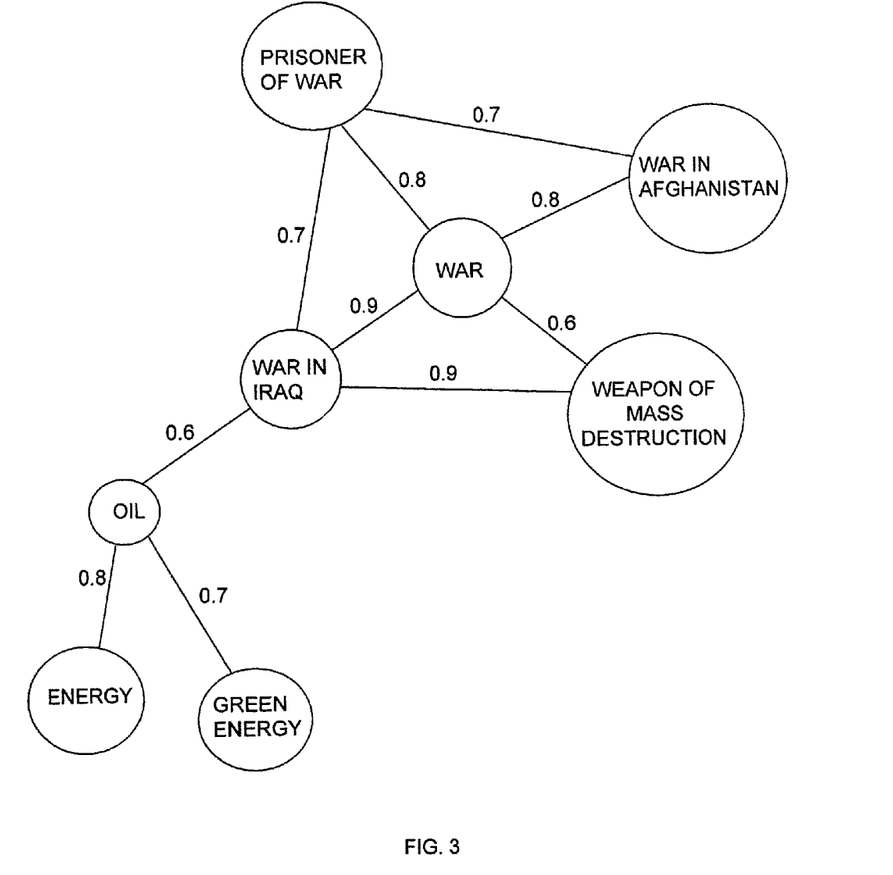
FIG. 3 is an exemplary diagram showing some exemplary categories with their exemplary respective weights.

FIG. 3 is an exemplary diagram showing some exemplary categories with their respective exemplary weights.

Boosting Factors

After the initial scores for the identified documents have been determined, and after the event criteria and search setting limitations have been applied, boosting factors are applied to these remaining, relevant documents so that more relevant documents will have higher scores. In the preferred embodiment, the following boosting factors are used: a Lucene Score; a "Document Rating" boosting coefficient; a "Document Type" boosting coefficient; a "Document Source" boosting coefficient; a "Number of Views" boosting coefficient, and a "Person of Interest" boosting coefficient. It will be appreciated that none, one, some, or all of these factors may be used.

The Lucene Score is the score that is returned by a Lucene search engine. The Lucene Score is normalized and takes a value between 0 and 1. The score of query "q" for a document "d" correlates to the cosine-distance or dot-product between document and query vectors in a Vector Space Model (VSM) of Information Retrieval. A document whose vector is closer to the query vector in that model is scored higher. Some of the factors used in computing the Lucene score are the frequency of the term (the number of times the term appears in the current document), the inverse of the number of documents in the database in which the term appears, how many of the search terms are found in the specified document, and a normalizing factor used to make scores between queries comparable. As a result, more occurrences of a given term result in a higher score, rarer terms result in a higher contribution to the total score, and a document that contains more of the query's terms will receive a higher score than another document with fewer query terms. The normalizing factor does not affect document ranking as all ranked documents are preferably multiplied by the same factor, but this makes scores from different queries (or even different indexes) comparable. Additional information on Lucene scoring is available at http://lucene.apache.org.

In a preferred embodiment, searchers who have viewed the document are allowed to rate the relevance of the document to the search query. The "Document Rating" boosting coefficient is a normalized average rating on the document by those searchers and, preferably but not necessarily, has a value between 0 and 1.

The "Document Type" boosting coefficient is defined for every Document Type value, is also preferably a normalized coefficient, and also preferably has a value between 0 and 1. This coefficient gives a higher value to documents arising out of certain settings than of other settings. In a preferred embodiment, and in a political context, for example, the preferred boosting coefficients are: Speech—1; Town-Hall Meeting—0.7; Debate—0.5; Advertisement—0.3; and Interview—0.3. These values are preferred, but are exemplary, and other values may be used depending upon the emphasis desired. Also, other document types will be appropriate for other areas, such as in a sports context (e.g., championship game, playoff game, regular season game, exhibition game, etc.) or in a business context (e.g., Securities Exchange Commission (SEC) filing, annual report, quarterly report, public statement, advertisement, etc.).

The "Document Source" boosting coefficient is defined for every Document Source value, is also preferably a normalized coefficient, and also preferably has a value between 0 and 1. This coefficient gives different values to documents based upon the source of the document. For example, a statement by a candidate is given a higher value than a report on the statement by a media group or a special interest group. In a preferred embodiment, and in a political context, for example, the preferred boosting coefficients are: Candidates or Political Office Holders—1; Media—0.7; Special Interest Groups (SIGs)—0.5; political parties—0.3; and from a general user—0.3. Also, other document source types will be appropriate for other areas, such as in a sports context (e.g., league, team coach, player, etc.) or in a business context (e.g., owner, CEO, Board of Directors, CFO, president, vice-president, manager, employee, etc.).

The "Number of Views" boosting coefficient is also preferably a normalized coefficient, and also preferably has a value between approximately 0 and 1. This coefficient is calculated as: $1-(1/(\ln(\text{Number of Views}+3)))$, where "ln" is the natural logarithm, "Number of Views" is the number of times that the document has been viewed, and the number "3" is an approximation, used for convenience, of the value for "e"–2.71828 . . . .

The "Person of Interest" boosting coefficient is a coefficient that is calculated for the primary speaker (or author) in the document. This coefficient acknowledges that documents regarding certain people, and certain offices, are more likely to be relevant than documents regarding other people. For example, the President of the United States is considered to be a person of greater interest than, for example, the mayor of a city. Preferably, this coefficient is not a normalized coefficient and, preferably, may have a value greater than 1. If a document has several primary speakers (or authors) then the maximum "Person of Interest" boosting coefficient is applied. Also, in a political context, for example, the weight of the relationship between a Person and a Political Office are relevant: a person can be the current holder of a political office—1; the person can be a former holder of the political office—0.75; or the person can be a candidate for the political office—1. It is possible for more than one of these relationships to be present at the same time. For example, the person could be a former mayor, who was subsequently elected and is now the current mayor, and who is also running for re-election for mayor. Also, other Person of Interest types will be appropriate for other areas, such as in a sports context or in a business context.

In a preferred embodiment, in a preferred context, different political offices are deemed to be in different bands or levels and therefore to have different weights. Table 1 shows exemplary, and preferred, political offices, bands, and weights.

TABLE 1

BANDS, WEIGHTS, AND POLITICAL OFFICES

| Band/Level | Political Office, Appointment, Or Other Relevant Position | Weight | Equivalent Political Office Positions |
|---|---|---|---|
| 1 | President | 25 | |
| 2 | Vice President | 23 | |
| 3 | Presidential Press Secretary | 22 | |
| 4 | Presidential Cabinet Member | 20 | Secretary of Defense, Secretary of State, Secretary of The Interior, Attorney General, etc. |
| 5 | Other Presidential Administration and Officials | 18 | FBI Director, Chief of Staff, EPA Director, Trade Rep, Ambassadors, Federal Reserve Chair, etc. |
| 6 | Foreign Heads of State and Ambassadors | 17 | British Prime Minister, Canadian Prime Minister, Russian President |
| 7 | United States Senator | 16 | |
| 8 | United States Representative | 15 | |

TABLE 1-continued

BANDS, WEIGHTS, AND POLITICAL OFFICES

| Band/Level | Political Office, Appointment, Or Other Relevant Position | Weight | Equivalent Political Office Positions |
|---|---|---|---|
| 9 | Other Major National Political Figure or Advisor, or a major Media figure | 14 | The First Lady/Gentleman, Reverend Jesse Jackson, Democratic National Committee Chair; Republican National Committee Chair, Judicial (e.g., Supreme Court and Federal Judges) |
| 10 | Military Commanders | 13 | Army Generals, Navy Admirals, Air Force Generals |
| 11 | State Governor | 12 | |
| 12 | State Lieutenant Governor | 10 | |
| 13 | Other Major State Political Figure or a State Media Figure | 9 | First Lady/Gentleman of the State, well-known activists and religious speakers, Judicial |
| 14 | State Senator | 8 | |
| 15 | State Representative | 7 | |
| 16 | State Department Secretary, Commissioner or Officer | 6 | Attorney Generals, Secretary of State, Secretary of Transportation, etc. |
| 17 | City Mayor | 5 | |
| 18 | City Councilperson | 3 | |
| 19 | County Commissioner | 2 | |
| 20 | Other office | 1 | |

To determine the Person of Interest boosting coefficient the relations between the person and the political office are determined and, for each related political office of the person, the band/level of the person is determined based on the related political office, and is then multiplied by the weight of the relationship between the person and the political office (current, former, candidate) to produce a temporary value. The weight of the Person is then the maximum of these temporary values. Also, if several relationships have this same maximum weight then the relationship with the highest band level is selected for that person.

For example, if a person is a former holder of the 'President' Political Office then one temporary weight of that person is $W1=25*0.75=18.75$. If that person is also the current holder of the "Air Force General" Political Office then another temporary weight for that person is $W2=13*1=13$. If that person is also a candidate for the "Attorney General" position then another temporary weight for that person is $W3=20*1=20$. That person therefore has a current weight of 20 and is band/level 4.

If that person is not appointed to be the Attorney General then that person will then have a weight of 18.75 (former President) and a band/level of 1.

A person's weight and band/level is re-determined any time the relationship of the person to a political office is changed.

Thus, the initial score of a document is then multiplied by one or more of, and preferably all of, the factors described above to determine a final score for that document: the Lucene Score; the Document Rating boosting coefficient; the Document Type boosting coefficient; the Document Source boosting coefficient; the Number of Views boosting coefficient, and the Person of Interest boosting coefficient.

In one embodiment, the "documents" are video clips.

Ranking Categories and Persons

When ranking the relevance of categories and persons, several factors are considered, including, but not limited to: the number of searches for that category/person compared to the total number of category/person searches, the number of searches made for related categories/persons, the number of documents which are related to the category, the total number of defined categories, the person's position (candidate, in office, formerly in office), the person's past/present office, and/or the proximity of the current date to an election date (either before or after).

A category is assigned a score according to the following:

$$\text{Issue Rank SCORE}_{-i=l} \frac{S_x}{NoS_i} + k2 * \frac{\sum_{i=1}^{N} W_{ix}}{\sum_{i=1}^{N}\sum_{j=1}^{N} W_{ij}} +$$

$$k3 * \frac{\sum_{i=1}^{N} W_{ix} * NoS_i}{\sum_{j=1}^{N}\sum_{i=1}^{N} W_{ij} * NoS_i} + k4 * NoV_x + k5 * \frac{\sum_{i=1}^{N} W_{ix} * NoV_i}{\sum_{j=1}^{N}\sum_{i=1}^{N} W_{ij} * NoV_i}$$

wherein:

X denotes a category;

k1 is a coefficient representing the number of searches made regarding category X;

$NoS_x$ is the number of searches made regarding category X;

N is the total number of defined categories;

$NoS_i$ is the number of searches made for each category I;

k2 is a coefficient representing the weight of the relationship between category X and all other categories;

$W_{ix}$ is the weighted relationship between category X and another category I;

k3 is a coefficient representing the weighted number of searches made against related categories;

k4 is a coefficient representing the number of documents related to category X;

$NoV_x$ is the number of documents related to category X; and k5 is a coefficient representing the number of documents related to the category related to category X.

This scoring technique can be used regardless of the type of the document but, in a preferred embodiment, the documents are primarily video clips. Once the scores have been assigned to the categories then the categories can be sorted or ranked based upon those scores. Note that the score, and therefore the rank, of a category will change from time to time.

This score can also be assigned to a document related to that category. If a document is related to several categories then the document is assigned the highest score of the related categories. Documents can then be ranked based upon those assigned scores.

Similarly, a Person of Interest (or any person) can also be assigned a score according to the following:

$$\text{SCORE} = kp * Bol_y + kn * \frac{NoS_y}{\sum_{i=1}^{M} NoS_i} + kd * PoE(DateOfElection)$$

wherein

Y denotes a person;

$k_p$ is a coefficient for the broadness of impact rank;

$Bol_y$ is the broadness of impact rank of the person Y, the values in Table 1 may be used for this factor, preferably modified by the weight (current, former, candidate) of person;

kn is a coefficient for the number of searches made regarding the person Y;

$NoS_y$ is the number of searches made regarding the person Y;

$NoS_i$ is the number of searchers made regarding each person;

kd is a coefficient for the proximity of an election involving the person Y; and PoE(DateOfElection) is a relevance factor based upon the proximity of an election involving the person Y;

$$PoE(DateOfElection) = \begin{cases} \frac{k_{PoE1}}{DateOfElection - CurrentDate}, & CurrentDate < DateOfElection, \text{ in months} \\ 1, & CurrentDate = DateOfElection \\ \frac{k_{PoE2}}{CurrentDate - DateOfElection}, & CurrentDate > DateOfElection, \text{ in days} \end{cases}$$

wherein:

$k_{poE1}$ is a coefficient for proximity of elections for the time before the date of the election involving the person Y;

$k_{poE2}$ is a coefficient for proximity of elections for the time after the date of the election involving the person Y.

Once the scores have been assigned to the persons then the persons can be sorted or ranked based upon those scores. Note that the score, and therefore the rank, of a person will change from time to time.

This score can also be assigned to a document related to that category. If a document is related to several persons then the document is assigned the highest score of the related persons. Documents can then be ranked based upon those assigned scores.

Displays

Ranking categories and persons allows for other display options. In one embodiment, after the search request has been entered, the user may be presented with various display options. For example, based upon the search request, various categories may have been identified and/or various persons of interest may have been identified. Therefore, the user may be presented with a pull-down menu of display options, for example: the search results are displayed in a conventional single column format; the categories are displayed and the most relevant documents within each categories are presented; the persons of interest are displayed and the most relevant documents with respect to each person of interest are presented; or the display is a two dimensional display, the categories are and the persons of interest are the two coordinate axes, and the most relevant document or documents with respect to both a category and a person of interest are presented.

Figure 4:
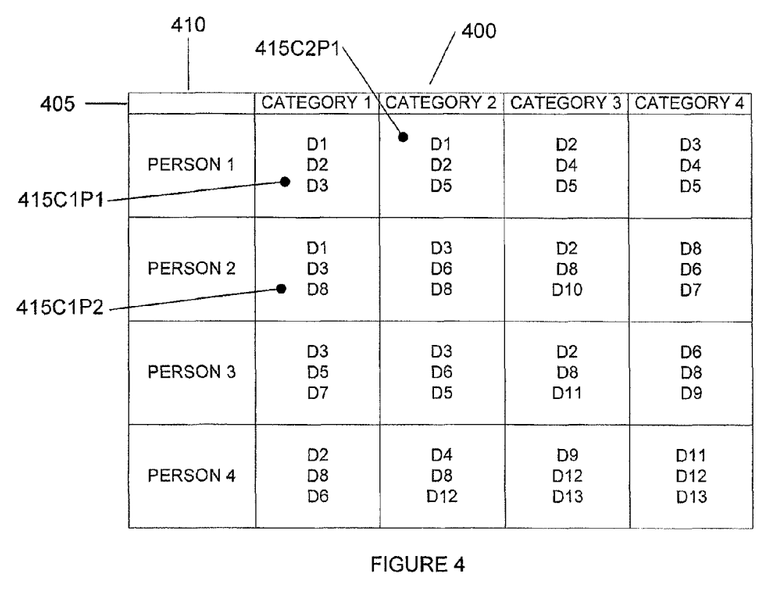
FIG. 4 is an illustration of an exemplary two-dimensional display array.

FIG. 4 shows such an exemplary two-dimensional array 400. One coordinate axis is the "CATEGORY" axis 405, and the other coordinate axis is the "PERSON" (person of interest) axis 410. Each cell 415CxPy (e.g., 415C1P1, 415C1P2, 415C2P1, etc., where "Cx" is the category and "Py" is the person) indicates one or more of the documents (e.g., D1, D2, D3, etc.) which are ranked as more relevant to both that particular category and that particular person. "D#" indicates a reference to a document, which may a link, the title of the document, part of the headline of the document, a keyword in the document, or some other desired information about that document; preferably information which will advise the user of the content of that document. The number of categories, the number of persons, and the number of documents referenced in the table, and the particular information displayed about each document in the table, is determined, for the most part, by how large (screen size) the table is desired to be. Thus, a table which is to be viewed as a single screen will have a limited number of categories, a limited number of persons, a limited number of documents referenced, and/or a limited amount of information which is displayed. Conversely, a table which is spread across several screens, so that the user has to scroll left/right and/or up/down to see the entire table, will have a larger number of categories, a larger number of persons, a larger number of documents referenced, and/or a greater amount of information which is displayed. Preferably, the reference "D#" is a hyperlink so clicking on the reference will bring up the document itself, or at least a part of the document or some information about the document.

In another embodiment, rather than presenting two or more documents in each cell of an array, only one document is presented, such as the headline or a summary of document. Clicking on the document indication will cause more, or all, of the document, or some more information about the document, to be brought up and presented.

In one embodiment, the system tracks search requests in different context areas, such as, for example, politics, sports, business, etc. An array is then generated for that context area which, based upon the search requests, indicates the categories of interest, the persons of interest, and the related documents. Thus, a user may go to the system web site and be immediately presented with an array for a predetermined context area, such as politics, which may change from time to time, or there may be several arrays, such as politics, business, sports, etc., and the user may be presented with the choice of which area the user desires to see. The user can click on the desired choice and be presented with an array for the desired context. Of course, the user also has the option of conducting a search rather than just viewing the existing arrays.

In another embodiment, entities which pay for the privilege may be allowed to submit search requests, and have the results presented in an array as a form of paid advertising. The array may be presented either on the system web site, for one fee, or via a hyperlink from the web site of the entity, for another fee. For example, a political party may wish to present its candidate(s) in a favorable light. That party would then submit one or more search requests which contained search terms related to the desired persons or categories. When that party had found the combination of search terms, categories, and persons that gave the desired result, then that result would be saved and displayed, such as in an array, at either the system web site or via a hyperlink from the party's web site.

In another embodiment, categories of current interest and persons of current interest are identified and ranked. The categories and persons of interest may be determined by keeping statistics on recent search requests by users and/or by a vote of the administrators. These categories and persons of current interest, along with their respective rankings are used for the coordinate axes for a display, and the relevant documents are indicated in the display.

When a person goes to the web site then, either as the first web page, or as a web page which can be brought up by clicking on a link, the array display of the categories and persons of current interest and relevant documents is presented. Thus, the person can immediately see documents of current interest without conducting a search. This may inspire the person to conduct a search to obtain more information on one or more of the categories or persons indicated.

In another embodiment, if a person is viewing a document, for example, an article in an online newspaper or a news reporting web site, or if a person is listening to video clip or a sound bite, and that person desires more information, then clicking on, for example, the title or the headline of the document, or a syllabus or summary of the document, or the first paragraph of the document, or anywhere within the document, or even a "search" icon associated with the document, then at least some of the information in the document (for example, the title, headline, or the summary, etc.) is sent to the search engine.

In one embodiment, this causes the search engine to conduct a search, preferably an expanded search, using the terms from that information, and the search results are then presented to the user. In another embodiment, as each document is preferably associated with one or more categories, clicking on the document causes a search to be initiated as if the user had entered the keywords of those categories. In another embodiment, this causes search engine to conduct a search, preferably an expanded search, using the terms from that information.

The result of clicking the document may be that other relevant documents are presented to the user. In another embodiment, the most relevant video found by the resulting search is presented to the user. This video may be shown via a standard movie player or a custom movie player. This video may be a full screen video or may be a window in the screen. There may or may not be a charge for viewing the video although, preferably, the user would be allowed to see, without charge, enough of the video to determine whether the video is something that the user wanted to see more of.

Document Sources, Control and Review

Documents to be entered into the documents database may come from several different sources. For example, the system administrators may search for and identify documents; a robot, such as a web crawler, may search the Internet for documents containing any of the keywords in the categories database; the administrators may cause the system to "subscribe" to emails or newsfeeds from selected persons or entities; entities paying for the privilege may be allowed to upload documents for entry; entities paying for the privilege may be allowed to upload documents for entry and propose the document categories; the administrators may allow the system to accept document submissions from selected person or entities; and/or anyone accessing the system, such as visiting the web site, can upload documents. Combinations of the above can also be used. In one embodiment, any document to be entered has to be approved for entry by at least one administrator. In another embodiment, documents submitted are automatically entered, subject to later removal or restriction by one or more administrators.

Also, as mentioned above, whenever a user views a document, the user may enter a rating which indicates how relevant the user thought the document was to the user's search request. Thus, if a document has been rated by users as being of little relevance to the search then one or more administrators may review the document and the search requests to determine whether the document is in one or more incorrect categories, or whether the document includes keywords which are not relevant to the document but have been inserted simply to make the document show up in search results for more exposure.

In one embodiment, a plurality of administrators control the overall operation, preferably by at least a majority vote. The administrators are preferably selected based upon their knowledge and experience in a particular category or categories. For example, some administrators for a political category may be political science professors, news commentators, political analysts (preferably independent), certain types of talk show or talk radio hosts, etc. As another example, some administrators for a sports category may be team coaches, sports commentators, sports writers, former major players, etc. "Super administrators" may also be appointed or elected to resolve disputes which occur between administrators and/or to break a tie vote.

Any process descriptions, steps, or blocks in the figures should be understood as potentially representing modules, segments, or portions of code which include one or more executable instructions for implementing specific logical functions or steps in the process. Alternate implementations are included within the scope of the preferred embodiments of the systems and methods described herein in which steps or functions may be deleted, executed out of order from that shown or discussed, executed concurrently, substantially concurrently, or sequentially, or in reverse order, depending on the functionality involved.

A system for implementing the present invention preferably includes one or more computers, such as servers having associated databases, operating system software, software suitable for conducting searches, input and output ports and/or portals, Internet access, static, dynamic, and redundant memories, security features, etc. Except for the various techniques described herein, such components, and the operation and arrangement and interconnection thereof, are well known in the field of search engines and systems. It is not believed that a block diagram showing these well-known components is necessary or would impart any additional information to one of skill in the art and, therefore, such a block diagram is not included herein.

Conditional language, such as, among others, "can", "could", "might", or "may", unless specifically stated otherwise, or otherwise understood within the context as used, is generally intended to convey that certain embodiments optionally could include, while some other embodiments do not include, certain features, elements and/or steps. Thus, such conditional language indicates, in general, that those features, elements and/or step are not required for every implementation or embodiment. Also, "such as", "for example", and the like are intended to indicate some, but not all, possibilities, and are not intended to be limiting or to limit the possibilities to those stated.

Although various embodiments of the present invention have been described in detail herein, other variations may occur to those reading this disclosure without departing from the spirit of the present invention. Further, various aspects, benefits, capabilities, embodiments and/or features described herein may be used independently or in combination, as appropriate to achieve a desired result; it is not necessary to incorporate every aspect, benefit, capability, embodiment and/or feature into a single implementation in order to obtain specific desired aspects, benefits, capabilities, and/or features, and all such variations are included within the scope of the present inventions. Accordingly, the scope of the present invention is to be defined or limited only by the accompanying claims.

What is claimed is:

1. A computer-implemented method of ranking categories, each category having at least one keyword, each category having a plurality of associated documents, a search engine identifying relevant categories based upon a comparison of category keywords with search terms in a search request provided to the search engine, the computer-implemented method comprising:

assigning a score to each category using the relationship $$\text{Issue Rank}(X) = k1 * \frac{NoS_x}{\sum_{i=1}^{N} NoS_i} + k2 * \frac{\sum_{i=1}^{N} W_{ix}}{\sum_{i=1}^{N}\sum_{j=1}^{N} W_{ij}} +$$

$$k3 * \frac{\sum_{i=1}^{N} W_{ix} * NoS_i}{\sum_{j=1}^{N}\sum_{i=1}^{N} W_{ij} * NoS_i} + k4 * NoV_x + k5 * \frac{\sum_{i=1}^{N} W_{ix} * NoV_i}{\sum_{j=1}^{N}\sum_{i=1}^{N} W_{ij} * NoV_i}$$

wherein:

X denotes a category;

k1 is a coefficient representing a number of searches made regarding the category X;

$NoS_x$ is the number of searches made regarding the category X;

N is a number of categories defined;

$NoS_i$ is a number of searches made for each category I;

k2 is a coefficient representing a weight of a relationship between the category X and all other categories;

$W_{ix}$ is a weighted relationship between the category X and another category I;

k3 is a coefficient representing a weighted number of searches made against related categories;

k4 is a coefficient representing a number of video clips related to the category X;

$NoV_x$ is the number of video clips related to the category X;

k5 is a coefficient representing a number of video clips related to categories related to the category X; and, ranking the categories based upon the assigned scores, wherein the assigning of a score to each category and the ranking of the categories based upon the assigned scores are performed using software running on at least one computer including at least one non-transitory computer storage medium for storing the software for performing the assigning and the ranking.

2. The computer-implemented method of claim 1 further comprising assigning to a document a highest score of the categories relevant to the document; and ranking the documents based upon the assigned scores.

* * * * *